N. O. NORELL.
WIRE ROPE HOOK DEVICE.
APPLICATION FILED JAN. 26, 1911.
1,043,964.
Patented Nov. 12, 1912.
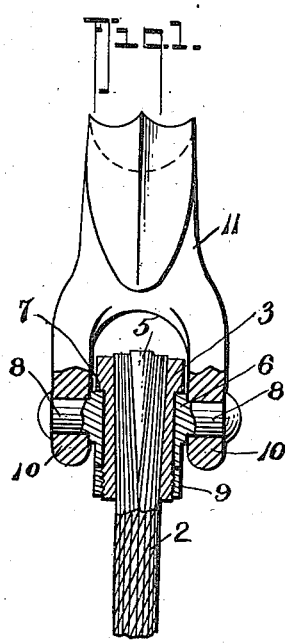
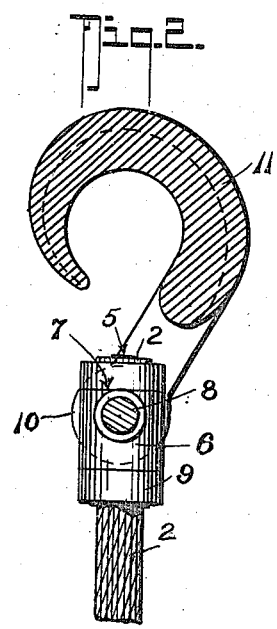
WITNESSES:
John J. Schrott
Effie J. James
INVENTOR
Nels O. Norell
BY
Fred G. Dieterich & Co.
ATTORNEYS.

UNITED STATES PATENT OFFICE.

NELS O. NORELL, OF VANCOUVER, BRITISH COLUMBIA, CANADA.

WIRE-ROPE HOOK DEVICE.

1,043,964.     Specification of Letters Patent.     Patented Nov. 12, 1912.

Application filed January 26, 1911. Serial No. 604,798.

*To all whom it may concern:*

Be it known that I, NELS OLOF NORELL, citizen of the Dominion of Canada, residing at Vancouver, in the Province of British Columbia, Canada, have invented a new and useful Wire-Rope Hook Device, of which the following is a specification.

This invention relates to a manner of attaching a hook to the extreme end of a wire rope whereby the necessity for splicing or otherwise forming a loop on the end of the rope is dispensed with, and the hook is connected to the rope in a manner which affords every facility for movement of the hook whether on the axis of the rope as in swiveling, or in the plane of the axis of the rope as when trunnion mounted thereon.

The invention is devised as a modification of that on which a patent application was filed by me on the 17th of June 1910 under Serial No. 567,464. The application referred to revealed a means for attaching a swiveling loop or shackle to the end of a wire rope: To that loop it is occasionally necessary to removably connect by a hook another line or a sling. This improvement has been devised to connect the hook direct to the rope end in the place of the loop or shackle revealed in the application just referred to.

The invention is particularly described in the following specification, reference being made to the drawings by which it is accompanied, in which:

Figure 1 is a longitudinal section showing the connection of the hook to the wire rope, and Fig. 2 a side elevation of the same wherein the hook is shown in section.

In these drawings 2 represents the end of a wire rope on which, as in the earlier invention, a sleeve 3 is secured by means of a conical wedge 5 introduced in the core of the rope inserted in the bore of the sleeve 3, which bore is tapered slightly as shown, at an angle less than that of the securing wedge 5. On the outer side of the sleeve 3 a ring 6 is rotatably mounted having trunnion pins 8 projecting from it, and this ring 6 is held in place and insured free rotation by a shoulder 7 of the sleeve 3 and a ring nut 9 threaded on the lower part of the sleeve. On the trunnion pins 8 are fitted the eyes 10 of a hook 11 the jaw of the hook on which the eyes are formed being deep enough to clear the end of the swivel sleeve and permit perfect freedom of movement of the hook on the trunnion pins. The hook 11 may be of any convenient form suited to its particular use, either a broad flat hook adapted to receive a wire rope without kinking or otherwise injuring it, or an ordinary bull hook for attachment to any required tackle.

A particularly simple and efficient means is thus provided for mounting a hook of any kind on the end of a wire rope and that in a manner that it may either swivel or be susceptible of rotational movement in a plane through the axis of the rope.

Having now particularly described my invention I hereby declare that what I claim as new and desire to be protected in by Letters Patent, is:

1. A ring having radial trunnions and swivelly mounted on a rope, a hook having bifurcations provided with bearings to receive said trunnions, said bifurcations straddling said ring, the curvature of said hook being such that the line of draft of the hook will lie in a plane containing the axial line of said trunnions and the axial line of said ring.

2. As a means for attaching a hook to the end of a wire rope, a sleeve in which the end of the rope is secured, a ring swivelly mounted on said sleeve, a hook having a bifurcated portion to straddle said sleeve, said hook at its bifurcation having bearing apertures, trunnions carried by said ring to fit in said apertures, the curvature of the hook being such that the line of draft of the hook will pass through the axial line of said trunnions at right angles thereto and in alinement with the axial line of said sleeve when the rope is under tension.

In testimony whereof I have signed my name to this specification in the presence of two subscribing witnesses.

NELS O. NORELL.

Witnesses:
ROWLAND BRITTAIN,
WM. S. SOUTAR.